No. 836,500. PATENTED NOV. 20, 1906.
H. HOWARD.
PROCESS OF PREPARING SOLUTIONS OF GASES.
APPLICATION FILED APR. 17, 1906.
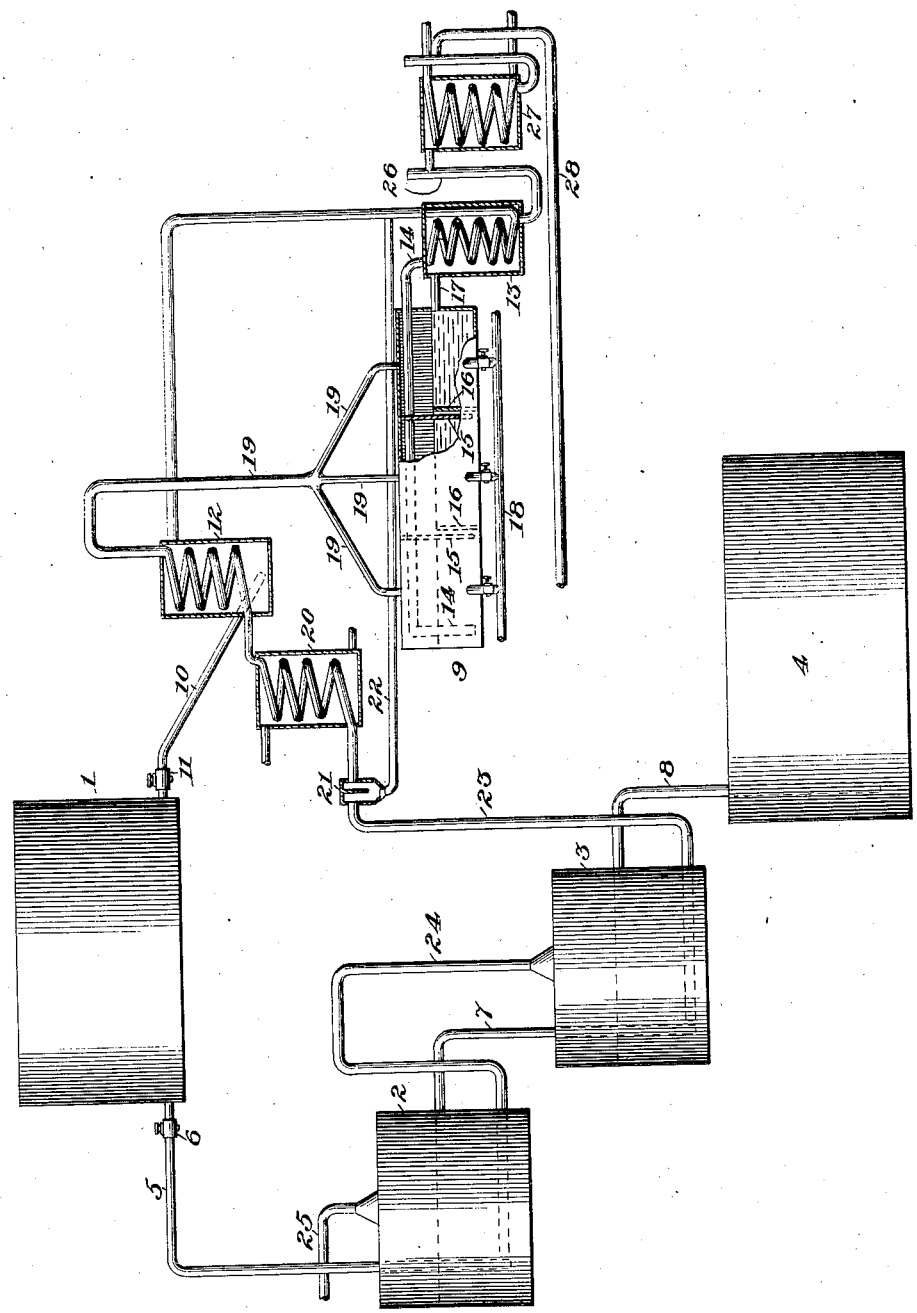
Witnesses:
Inventor:
Henry Howard,
by Byrnes & Townsend,
Attys.

UNITED STATES PATENT OFFICE.

HENRY HOWARD, OF NORTH WOBURN, MASSACHUSETTS.

PROCESS OF PREPARING SOLUTIONS OF GASES.

No. 836,500.     Specification of Letters Patent.     Patented Nov. 20, 1906.

Application filed April 17, 1906. Serial No. 312,249.

*To all whom it may concern:*

Be it known that I, HENRY HOWARD, a citizen of the United States, residing at North Woburn, in the State of Massachusetts, have invented certain new and useful Improvements in Methods of Preparing Solutions of Gases, of which the following is a specification.

This invention is a method of preparing solutions of gases of any desired concentration.

The invention will be described as applied to the preparation of sulfite liquors containing free sulfur dioxid, but is not restricted thereto.

In the use of sulfite solutions for the production of cellulose it is essential for the most effective and economical working that the solution should contain a certain proportion of uncombined sulfur dioxid and that this proportion should be within the control of the operator. When such liquors are produced by subjecting a solution containing lime or other base to contact with sulfur dioxid produced by burning sulfur or pyrites in air, and more particularly in the latter case by reason of the greater dilution of the sulfur dioxid, it often occurs that the percentage of free sulfur dioxid is less than is desirable or necessary. According to my invention such percentage is increased to any desired extent up to the amount corresponding to the saturation-point of a solution of given temperature under an atmosphere of pure sulfur dioxid at a given pressure. I accomplish this result by bringing the dilute sulfur dioxid produced by the combustion of sulfur or of pyrites into contact with a solvent liquor and absorbing it therein. I then expel the absorbed gas from such liquor or a portion thereof, and after separating part or all of the moisture from the gas, if this should be deemed desirable, I cause the gas to be absorbed to the desired extent in the sulfite liquor. Preferably I prefer a sulfite solution containing free sulfur dioxid by means of burner-gases in the usual way and subsequently expel the gas from a portion of said solution and absorb it in another portion thereof, thereby increasing the gas content of the second-mentioned portion to any desired extent. The portion of the liquor from which the gas has been expelled is then brought into contact with the burner-gases for restoring its content of sulfur dioxid. The method is readily made continuous, and any desired sulfur-dioxid content is secured by properly proportioning the portion of the liquor from which the gas is expelled to that in which the expelled gas is reabsorbed. Preferably, also, I effect an interchange of heat between the expelled gas and the inflowing solution and between the heated liquor and the inflowing solution, whereby a considerable economy is effected.

For a full understanding of my invention reference is made to the accompanying drawing, wherein the figure is an elevation, partly in section, of one form of apparatus for carrying my method into effect.

1 is a storage-tank for sulfite liquors prepared from burner-gases in the usual manner. 2, 3 are saturation-tanks wherein the sulfur-dioxid content of this liquor may be increased, and 4 is a storage-tank for the resulting sulfite solution. Solution flows from tank 1 through pipe 5, having a cock 6, to the saturator 2, overflows therefrom through pipe 7 to the saturator 3, and passes thence by pipe 8 to the storage-tank 4. Solution from tank 1 is also permitted to flow through pipe 10, provided with a cock 11, to a boiler or sulfur-dioxid generator 9, traversing in its passage two heaters or heat interchanges 12 and 13, each of which is shown as comprising a coil within a closed tank, the solution from tank 1 passing around the coil in heater 12 and through the coil in heater 13. From heater 13 the solution passes by pipe 14 to the generator 9. This generator may be of any suitable construction. As shown, it comprises a relatively shallow closed tank subdivided into several compartments by partitions 15 16 so arranged as to afford a restricted communication between adjacent compartments, liquid being introduced at one end of the tank through pipe 14, traversing the several compartments in succession and escaping at the opposite end through pipe 17.

Live steam is blown into the generator through pipe 18, having inlets to the several compartments, and serves to expel the sulfur dioxid from the solution therein. The expelled gas, together with the steam, is conducted through pipes 19 to the coil in heater 12, imparting a portion of its heat to the solution from tank 1. It may then be further cooled, by means of water or other cooling medium, in a condenser 20 and passes thence to a separator or trap 21 of any usual construction. The separated liquid, consisting of water saturated with sulfur dioxid, flows from the trap 21 to the generator 9 through pipe 22, preferably traversing the heater 13, as shown. The substantially pure sulfur dioxid is conducted from the trap 21 by pipe 23 to the saturator 3, wherein it is wholly or in part absorbed by liquor from tank 1, any unabsorbed portion passing by pipe 24 to saturator 2, thence by pipe 25 to be added to the burner-gases and utilized in the preparation of solution for tank 1. The heated solution from which sulfur dioxid has been expelled in the generator 9 overflows therefrom through pipe 17 into heater 13. Thence it flows by pipe 26 to a cooler 27, in which it is fully cooled by water, passing then through pipe 28 to the usual absorbing system, wherein it is brought into contact with the burner-gases and utilized in the preparation of solution for tank 1. It is understood that lime and water are added at the regular absorbing system in the usual way.

It will be observed that the volume and sulfur-dioxid content of the prepared solution passing to the storage-tank 4 is absolutely controlled by manipulation of cocks 6 and 11, the concentration of this solution with respect to sulfur dioxid being increased or diminished by permitting a greater or smaller proportion of the liquor from tank 1 to pass to the generator 9.

In practice cocks 6 and 11 are so manipulated as to insure at all times the preparation of solution which shall correspond in volume and in the percentage of absorbed gas to the requirements of the digesters.

I claim—

1. The method of preparing solutions of gases which consists in partially saturating a liquid with gas, then expelling the gas from one portion of the liquid and absorbing it in another portion thereof, and subjecting the portion of the liquid from which the gas has been expelled to contact with additional gas to again partially saturate it; substantially as described.

2. The method of preparing solutions of gases which consists in partially saturating a liquid by contact with diluted gas, then expelling the gas from one portion of the liquid and absorbing it in another portion thereof, and subjecting the portion of the liquid from which the gas has been expelled to contact with additional gas to again partially saturate it; substantially as described.

3. The method of preparing solutions of gases which consists in partially saturating a liquid with gas, then expelling the gas from one portion of the liquid and absorbing it in another portion thereof, subjecting the portion of the liquid from which the gas has been expelled to contact with additional gas to again partially saturate it, and repeating the operation; substantially as described.

4. The method of preparing solutions of gases which consists in partially saturating a liquid with gas, then expelling the gas from one portion of the liquid by heat, cooling the expelled gas by transferring heat therefrom to further portions of said liquid and absorbing the gas in a portion of the original liquid and thereby increasing the gas content of said liquid to the extent desired; substantially as described.

5. The method of preparing solutions of gases which consists in partially saturating a liquid with gas, then expelling the gas from one portion of the liquid by heat, cooling the expelled gas by transferring heat therefrom to further portions of said liquid, absorbing the gas in a portion of the original liquid and thereby increasing the gas content of said liquid to the desired extent, and subjecting the portion of the liquid from which the gas has been expelled to contact with additional gas to again partially saturate it; substantially as described.

6. The method of treating sulfite liquor which consists in expelling sulfur dioxid from a portion of such liquor, absorbing the expelled gas in another portion thereof, and subjecting the portion of the liquid from which the gas has been expelled to contact with additional sulfur dioxid to restore its content thereof; substantially as described.

7. The method of treating sulfite liquor which consists in expelling sulfur dioxid from a portion of such liquor, absorbing the expelled gas in another portion thereof, subjecting the portion of the liquid from which the gas has been expelled to contact with additional sulfur dioxid to restore its content thereof, and repeating the operation; substantially as described.

8. The method which consists in preparing a sulfite liquor containing an excess of sulfur dioxid, expelling sulfur dioxid from a portion of said liquor by heat, cooling the expelled sulfur dioxid by imparting heat therefrom to further portions of said liquor, absorbing the sulfur dioxid in a portion of the original liquor and thereby increasing its content of sulfur dioxid to the degree desired, and subjecting the portion of the liquor from which the gas has been expelled to contact with additional sulfur dioxid to restore its content thereof; substantially as described.

9. The method of preparing sulfite liquor, which consists in bringing diluted sulfur dioxid into presence of a suitable solvent and thereby forming a solution containing gas, then expelling the gas from said solution and absorbing the relatively concentrated gas in a sulfite solution; substantially as described.

10. The method of preparing sulfite liquor, which consists in bringing diluted sulfur dioxid into presence of a suitable solvent and thereby forming a solution containing the gas, then expelling the gas from said solution, separating moisture therefrom, and absorbing the relatively concentrated gas in a sulfite solution, substantially as described.

In testimony whereof I affix my signature in presence of two witnesses.

HENRY HOWARD.

Witnesses:
WARD B. KEITH,
EDWIN R. BOND.